United States Patent
Roodenburg et al.

(10) Patent No.: US 9,580,979 B2
(45) Date of Patent: Feb. 28, 2017

(54) TUBULARS HANDLING SYSTEM AND APPARATUS

(71) Applicant: ITREC B.V., Schiedam (NL)

(72) Inventors: Joop Roodenburg, Delft (NL); Pieter Dirk Melis Van Duivendijk, Missoury City, TX (US)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 14/771,733

(22) PCT Filed: Feb. 27, 2014

(86) PCT No.: PCT/NL2014/050122
§ 371 (c)(1),
(2) Date: Aug. 31, 2015

(87) PCT Pub. No.: WO2014/133389
PCT Pub. Date: Sep. 4, 2014

(65) Prior Publication Data
US 2016/0017673 A1    Jan. 21, 2016

(30) Foreign Application Priority Data

Mar. 1, 2013 (NL) ...................................... 2010378

(51) Int. Cl.
*E21B 19/15* (2006.01)
*B65G 47/248* (2006.01)
*F16L 1/20* (2006.01)

(52) U.S. Cl.
CPC ............ *E21B 19/155* (2013.01); *B65G 47/248* (2013.01); *F16L 1/207* (2013.01); *E05Y 2201/726* (2013.01); *Y10T 74/18024* (2015.01)

(58) Field of Classification Search
CPC ......... E21B 19/155; E21B 19/15; F16L 1/207; B65G 47/248; E05Y 2201/726; Y10T 74/18024; Y10T 74/18032; Y10T 74/18216; Y10T 74/18232; Y10T 74/20305
(Continued)

(56) References Cited

U.S. PATENT DOCUMENTS 2,385,676 A * 9/1945 Axe ................................. 49/351
3,860,122 A    1/1975 Cernosek
(Continued)

FOREIGN PATENT DOCUMENTS

CA    2552173 C * 9/2010 ............ E21B 19/155
DE    WO 2011120627 A2 * 10/2011 .............. E21B 19/15
(Continued)

OTHER PUBLICATIONS

"Drilling Huisman product brochure", Mar. 30, 2013, pp. 1-17, XP055088922, Retrieved from the Internet: URL:http://www.huismanequipment.com/documenten/2013_brochures/brochure_drilling_2013_-_e-mail.pdf, [retrieved on Nov. 18, 2013], p. 27.
(Continued)

*Primary Examiner* — Gregory Adams
(74) *Attorney, Agent, or Firm* — Birch, Stewart, Kolasch & Birch, LLP

(57) ABSTRACT

System and apparatus (1) for moving a tubular between a substantially horizontal position and an upward angled position, e.g. substantially vertical position. The apparatus comprises a base (3), and a boom (4) pivotally attached to the base about a horizontal boom pivot axis between a substantially horizontal position and an upward angled position, e.g. substantially vertical position. A boom pivot drive (50) is mounted on said base and adapted to pivot the boom. A tubular gripper (7; 80) is attached to the boom and adapted for gripping the tubular (20, 20', 20"). The boom pivot drive comprises a central gear wheel (53) that is rotatable mounted
(Continued)

Figure 1:
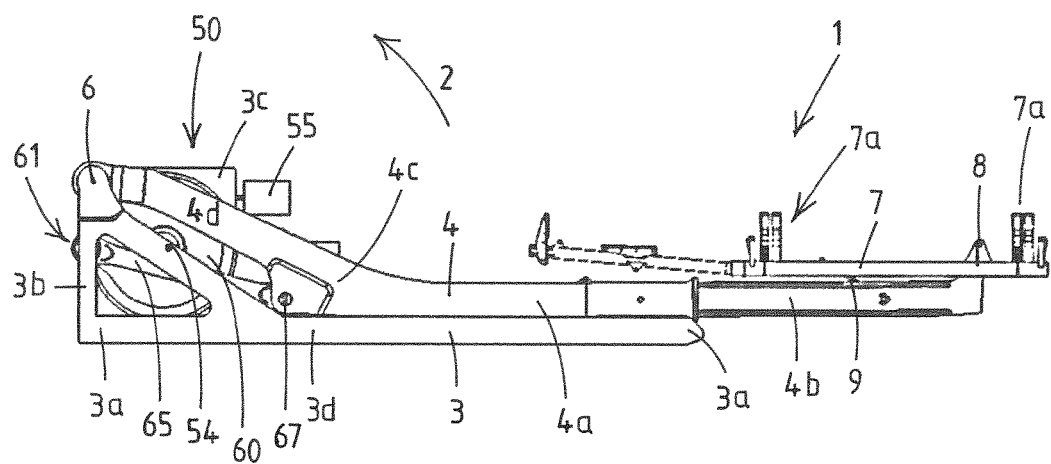

on the base about a central gear wheel axis (54) parallel to the horizontal boom pivot axis (6), which central gear wheel is connected directly or via a transmission to the boom. One or more drive gear members (51) are each rotatable mounted on the base and each rotatable about a corresponding drive gear member axis (52), meshing with the central gear wheel. One or more motors (55) connect to said drive gear members and allow to pivot the boom.

24 Claims, 9 Drawing Sheets

(58) Field of Classification Search
USPC .......... 254/112, 113, 120, 123, 422, 46, 8 R;
254/414/22.51–22.59, 22.61–22.63,
414/22.65–22.68, 744.7, 758, 763, 766,
767, 414/769, 771, 772, 776, 779, 919;
74/22 A, 22 R, 74/23, 24, 25, 40, 46,
490.07, 490.1, 52, 88, 74/89, 89.16,
89.17, 89.18
See application file for complete search history.

(56) References Cited

U.S. PATENT DOCUMENTS

| | | | |
|---|---|---|---|
| 4,000,581 A * | 1/1977 | Fukumoto | E05F 11/382 |
| | | | 49/103 |
| 4,403,897 A | 9/1983 | Willis | |
| 4,706,948 A | 11/1987 | Kroecher | |
| 4,834,604 A * | 5/1989 | Brittain | E21B 19/155 |
| | | | 175/85 |
| 6,220,807 B1 * | 4/2001 | Sorokan | E21B 19/155 |
| | | | 166/77.52 |
| 6,533,058 B2 * | 3/2003 | Peter | B60R 21/38 |
| | | | 180/274 |
| 2003/0196791 A1 * | 10/2003 | Dunn | E21B 19/155 |
| | | | 166/77.51 |
| 2007/0031215 A1 | 2/2007 | Belik | |
| 2010/0329823 A1 * | 12/2010 | Baumler | E21B 19/20 |
| | | | 414/22.55 |
| 2011/0200412 A1 * | 8/2011 | Orgeron | E21B 19/087 |
| | | | 414/22.55 |
| 2012/0130537 A1 | 5/2012 | Gerber | |

FOREIGN PATENT DOCUMENTS

| | | | | |
|---|---|---|---|---|
| EP | 0 218 991 A2 | 4/1987 | | |
| FR | 2 544 789 A1 | 10/1984 | | |
| GB | 2 057 385 A | 4/1981 | | |
| GB | 2 200 585 A | 8/1988 | | |
| NL | WO 2012165951 A2 * | 12/2012 | ........... | E21B 19/155 |
| WO | WO 2006/038790 A1 | 4/2006 | | |

OTHER PUBLICATIONS

"Innorig Land Drilling Unit Huisman Product Brochure and Drilling Unit Introduction", Mar. 30, 2013, XP055088987, Retrieved from the Internet: URL:http://www.huismanequipment.com/documenten/2013_brochures/brochure_innorig_2013_-_email.pdf, [retrieved on Nov. 19, 2013], the whole document.

* cited by examiner

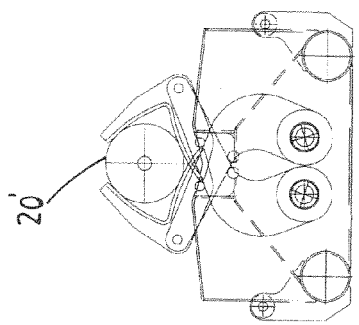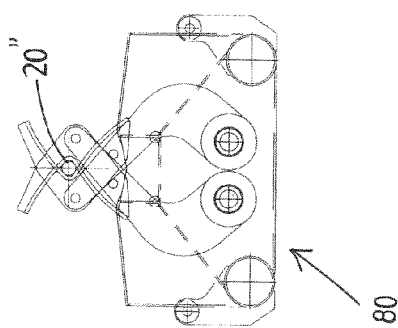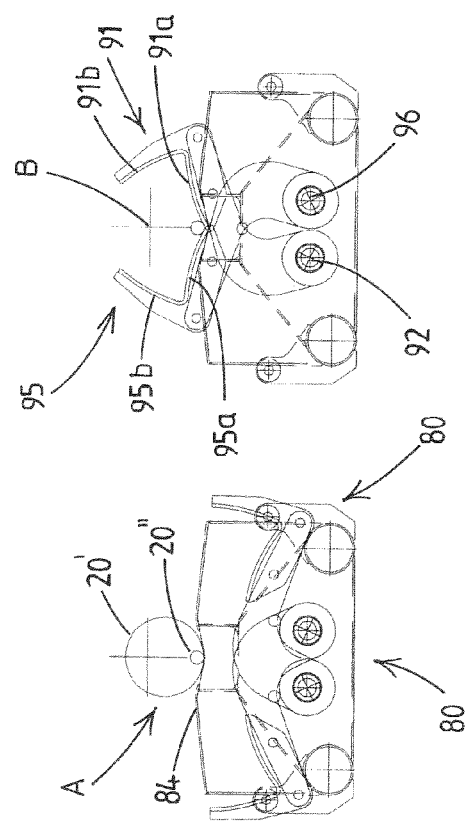

TUBULARS HANDLING SYSTEM AND APPARATUS

The present invention relates to an improved tubular handling apparatus for moving tubulars between a substantially horizontal position and an upward angled position, e.g. a substantially vertical position. The apparatus comprises a base, a boom pivotally attached to the base about a horizontal boom pivot axis between the substantially horizontal position and the upward angled position, and a boom pivot drive mounted on the base and adapted to pivot the boom. A tubular gripper is attached to the boom and adapted for gripping the tubular.

In the drilling industry it is common to use such a tubular handling apparatus for motion of the drilling tubular between the firing line of a drilling rig and a storage station. Commonly the pivot boom drive comprises one or more linear hydraulic cylinders arranged between the base and the pivotal boom. An example of a known drilling system with a drilling rig and a tubular handling apparatus is shown in WO2006/038790.

The tubular handling apparatus is subject to many different requirements. For example it is desired in a drilling rig that the tubular brought into the firing line lines up accurately with the drill pipe string to which the tubular is to be connected. Also high demands are placed on the speed of operation so that drilling tubulars can be moved at a rapid pace to (drilling) and away (tripping) from the firing line. Drilling is often done under harsh condition, e.g. in desert like environments. Furthermore (road-) transportable drilling rig systems are frequently moved from one location to the next, placing constraints on the dimensions of the tubular handling apparatus.

The presently available tubular handling apparatuses are not entirely satisfactory in view of one or more of the issues addressed above. It is therefore an object of the invention to provide measures that allow for an improved apparatus for handling tubulars and thereby allow to reduce or overcome one or more of the drawbacks of existing apparatuses.

According to a first aspect thereof the invention provides a system and apparatus according to the preamble of claim 1, wherein the boom pivot drive comprises:
- a central gear wheel that is rotatable mounted on the base about a central gear wheel axis parallel to the horizontal boom pivot axis, which central gear wheel is connected directly or via a transmission to the boom,
- one or more drive gear members that are each rotatable mounted on the base and each rotatable about a corresponding drive gear member axis, meshing with the central gear wheel,
- one or more motors connected to said one or more drive gear members and allowing to drive said one or more drive gear members so as to pivot the boom between said substantially horizontal position and said upward angled position.

By provision of the central gear wheel and one or more associated drive gears several advantages can be obtained when suitably designed.

For example the transportability of the tubular handling apparatus can benefit from a reduced size of the apparatus, which may follow from the use of a central gear wheel instead of the known arrangement with lengthy linear hydraulic cylinders. In existing designs the cylinders that pivot the boom need to have a large stroke and thus require much space. The inventive boom pivot drive can be configured as a compact unit.

Another advantage is that the inventive boom pivot drive allows for a smooth pivoting motion of the boom. It has been observed that in existing designs a shaking or vibration occurs when the boom reaches its end position, in particular its upwardly angled end position. This vibration is detrimental, e.g. in view of the desire to rapidly align a tubular with a drill string to which the tubular is to be connected. It has been found that this vibration is caused by the large hydraulic cylinders in the existing designs. The provision of the central gear wheel and one or more drive gears allows to obtain a smooth drive, with reduced or no noticeable vibration when an end position of the boom is reached. This for example allows to connect the tubular directly to the deployed drill string without handing over to a further tubular alignment device of the drilling rig.

Yet another advantage lies in the possibility to embody the pivot drive such that the gears are contained in a shielded housing, which is less sensitive to the environment (sand, wind) than the long linear hydraulic cylinders presently used.

In a preferred embodiment the one or more motors are electromotors having a rotary output shaft connected to said one or more drive gear members. In an alternative hydraulic motors with a rotary output shaft are proposed.

In a practical embodiment the drive gear member axis of each of said one or more drive gear members is parallel to the central gear wheel axis. For example the central gear and drive gear are embodied as gears with straight or with helical teeth.

In an alternative the central gear and one or more drive gears can be embodied as a worm-and-gear set.

In a preferred embodiment at least two drive gear members are present, each connected to an associated motor, the motors being embodied such that the boom is pivotal by means of a single motor in case of failure of one or more other motors.

It is noted that between each drive gear and the associated motor, e.g. a rotary output shaft motor, a transmission may be present, e.g. a reductor gear transmission, e.g. a worm-gear.

In view of the required torque to pivot the boom, as well as in view of a smooth drive of the boom, it is considered advantageous that the central gear wheel has a pitch circle diameter of at least 0.75 meter. By using a very large central gear, significant torque can be achieved in combination with a smooth run and durability of the drive.

In a practical embodiment the central gear wheel is an annular gear wheel having gear teeth on an inner face thereof.

The present invention envisages that the central gear wheel preferably has a circular toothed portion with gear teeth. As the pivoting of the boom is, however, usually significant less than a full revolution, one can also envisage embodiments wherein the central gear wheel is only a section of a truly circular gear wheel, e.g. embodied as a semi-circular section gear wheel. This "sectioned central gear wheel" may e.g. be used to allow for further reduction of the dimensions of the boom pivot drive.

The central gear wheel and drive gears are preferably common spur gears. The central gear wheel has advantageously a large diameter, while the one or more meshing drive gears have smaller diameters. This combination produces a mechanical advantage as the drive gears may be allowed to rotate fast, while the torque of the larger central gear is proportionally greater. One meshing drive gear may suffice for the purpose, but the provision of two or more meshing drive gears, each comprising an associated drive motor, is advantageous as a redundant design and in view of distribution of forces over the central gear wheel.

The present invention envisages that the central gear wheel may be connected directly to the boom, so as to rotate in unison with the pivoting boom, which embodiment entails that the central gear wheel axis coincides with the boom pivot axis.

In an alternative, preferred embodiment, it is envisaged that the pivot boom drive further comprises a crank member that is directly connected to the central gear wheel, which crank member rotates in unison with the central gear wheel about the central gear wheel axis, which crank member has a crank end remote from the central gear wheel axis, wherein the pivot boom drive further comprises a connecting rod, which is pivotally attached to the crank end via a first pivot axis, and pivotally attached to the boom via a second pivot axis remote from the boom pivot axis, wherein the horizontal boom pivot axis, and the first and second pivot axes of the connecting rod are parallel to each other.

An advantage of such a boom pivot drive with a crank and connecting rod is that it allows to achieve a compact design and at the same time an attractive drive that may achieve a high torque capacity, smooth drive, and stable end positions of the boom. The boom pivot drive then effectively forms part of a planar four-bar linkage together with the boom and the base, and all pivots. As a result of this planar four-bar linkage, an attractive supply of driving torque to the boom can be achieved throughout the entire movement of the boom and the tubular held by the gripper.

In a practical embodiment the pivot boom drive comprises a rotatable crank disc member that is rotatably mounted to the base so as to be rotatable about the central gear wheel axis, said crank disc member having an inner face to which the central gear wheel is attached, and said crank disc member having an outer face provided with a first pivot axis connection to the connecting rod. For example the disc member forms an exterior of a gear housing or casing of the pivot boom drive with the gear wheel and one or more drive pinions being housed in said housing or casing.

In a practical embodiment a roller bearing is provided between the base and the gearwheel, which roller bearing extends around the central gear wheel.

In an embodiment the gripper, e.g. according to the third aspect of the present invention, is attached to the boom so as to be always arranged generally along the front side or the upper side of the pivotal boom, so as to receive—with the boom in its horizontal position—a tubular in a horizontal orientation thereof generally parallel to the boom, spaced some distance from the front side or upper side of the boom. This allows to avoid the use of a gripper pivoting drive that is adapted to move the gripper from the underside of the horizontal boom to the front side of the upwardly angled or vertical boom, e.g. as in WO2006/038790.

Whilst it is preferred to avoid the use of a complex gripper pivoting drive that is adapted to move the gripper from the underside of the horizontal boom to the front side of the upwardly angled or vertical boom, the invention does not exclude such gripper pivot drive.

The invention does envisage, e.g. with the gripper attached to the boom so as to be always arranged generally along the front side or the upper side of the pivotal boom, that the gripper can be pivotally attached to the boom about a gripper pivot axis, parallel to the boom pivot axis, to allow for pivoting of the gripper relative to the boom, e.g. the boom having a near vertical end position and the gripper being pivotal to assume an exact vertical end position with said boom in near vertical end position.

In an embodiment the gripper is pivotal relative to the boom by a gripper pivot drive, for example comprising a hydraulic cylinder or a screw spindle drive extending between the gripper and the boom at a distance from the gripper pivot axis. Other powered actuators like an electric actuator, a winch and cable, a hydraulic rotary actuator, etc. are also possible in the gripper pivot drive.

In an embodiment the boom has a near vertical end position and the gripper pivot drive allows to bring the gripper in an exact vertical end position. Preferably, to increase operational speed whilst also avoiding undesirable tubular motion when reaching the vertical end position, the gripper pivot drive comprises a control unit that is adapted, e.g. programmed, to perform the gripper pivot motion before the boom reaches its near vertical end position.

A second aspect of the present invention relates to a system according to claim 15. This system includes a tubular handling apparatus for moving a tubular between a substantially horizontal position and an upward angled position, e.g. substantially vertical position, said apparatus having a boom pivot drive which comprises:

a crank member that is rotatably mounted to the base about an crank member axis parallel to the boom pivot axis, which crank member has a crank end remote from said crank member axis, a connecting rod, which is pivotally attached to the crank end via a first pivot axis, and pivotally attached to the boom via a second pivot axis remote from the boom pivot axis, wherein the horizontal boom pivot axis, and the first and second pivot axes of the connecting rod are parallel to each other, one or more motors that drive said crank member so as to pivot the boom between said substantially horizontal position and said upward angled position.

It will be appreciated that the provision of such a crank member and connecting rod have already been discussed in combination with a drive of the crank member by means of a central gear wheel and one or more drive gears according to the first aspect of the invention.

It is, however, envisaged, that the measures of the second aspect of the invention are also beneficial in combination with another design of the motor(s) and any associated transmission that drive the crank member for pivoting of the boom.

For example one can envisage the use of a rack-and-pinion drive of the crank, wherein the crank is fitted on a rotary shaft having the pinion, and wherein a reciprocal rack (e.g. hydraulically driven) engages on said pinion so as to rotate the shaft and thus the crank. The shaft could also be driven in another manner, e.g. by a hydraulic vane motor, or other high torque motor.

The system and tubular handling apparatus according to the first and/or second aspect of the invention can be employed for land-based (drilling) applications, but also offshore (drilling and marine pipe laying) application, e.g. wherein the apparatus is based on a (semi-submersible, monohull) drilling or pipe laying vessel or offshore drilling rig (such as a jack-up platform), are possible.

In a practical system a tubular storage station is provided, adjacent the boom in its substantially horizontal position, and the substantially vertical position is situated in or adjacent a firing line of a drilling rig structure, of a pipe laying system structure (e.g. J-lay). Preferably the handling apparatus brings the tubular directly into said firing line, without the need for any intermediate transferal to a crane or the like.

In an embodiment the system further comprising a tubulars storage station to be arranged adjacent the tubular handling apparatus, said storage station allowing for storage of multiple tubulars and sequential transfer of tubulars to the tubular handling apparatus.

In an embodiment the storage station allows for storage of multiple tubulars in horizontal position, parallel to the gripper when the boom is in its substantially horizontal position, e.g. the storage station being adapted to allow a tubular to roll towards the pipe gripper.

If desired the system may include a transfer crane to transfer the tubular from the upward angled, e.g. vertical, position reached by means of the tubular handling apparatus to another position, e.g. higher into a vertical firing line. For example, forming part of a drilling rig for transferring the tubular from the substantially vertical position to a position aligned with the firing line (the drill string) of the drilling rig.

It is also possible to store the tubulars vertically and raise them subsequently into a horizontal transfer position, e.g. when tubulars are stored vertically in a leg of a semi-submersible vessel.

The apparatus allows bringing the tubular to an upward angled position, which may be a vertical or near vertical orientation but also an inclined orientation, e.g. at an angle of at least 45°, more preferably at least 55°, with the horizontal. Commonly in the angled upward position the tubular is released from the gripper and transferred to another piece of equipment. For instance the tubular is transferred to an alignment device for aligning a vertically oriented tubular with the drill string in the drilling firing line of the drilling rig.

The tubulars that can be handled with the tubular handling apparatus according to the first and/or second aspect of the invention or a gripper according to the third aspect of the invention can be any type of tubular, e.g. a drilling tubular, such as an oil, gas, or water well drilling tubular and rods, drill pipes, drill collars, casings, production tubing, sucker rods, pump column pipes, logging tools, bottom hole assembly, pipeline joints, a hydrocarbon subsea pipeline section for offshore pipelaying, etc.

Advantageously, the tubular handling system and apparatus according to the first and/or second aspect of the invention can be operated at a high speed e.g. in order to maximize the efficiency of drilling operations. Yet another advantage of this apparatus is that the apparatus can be designed very safe, due to its stable construction.

In an embodiment of the tubular handling apparatus according to the first and/or second aspect of the invention that can easily be transported, e.g. by road vehicles, the boom is composed of multiple boom parts, e.g. telescoping boom parts or boom parts that can be assembled to make up the boom on site. This facilitates transportation as well as assembly and disassembly on site.

Advantageously, the base of the tubular handling apparatus is designed with a length and a width corresponding to an ISO freight container, preferably a 40 feet container, and may have ISO freight container corner fittings. This enhances the transporting of the apparatus from one drilling site to the next, e.g. by road vehicles.

In an embodiment the boom has—in its substantially horizontal position—a greater length than the length of the base, wherein the boom is composed of a base boom part that is connected to via the boom pivot axis to the base and of an extension boom part, the base boom part having a length such as to not extend beyond the base when in substantially horizontal position, and the extension boom part being telescopic relative to the base boom part or being releasably fastened to the base boom part, and wherein the gripper is attached to the extension boom part.

In an embodiment a part of the tubular handling apparatus, e.g. the boom, is telescopic to reduce the size to that of an ISO freight container, preferably a 40 feet container.

A third aspect of the present invention relates to a system for handling tubulars, said system comprising a tubular gripper having a frame and at least one gripper device, preferably at least two gripper devices as spaced apart positions on the frame, said at least one gripper device being supported by the frame and adapted to grip and hold a circular cross-section tubular having a diameter and longitudinal tubular centerline.

The gripper may be used in combination with the apparatus of the first and/or second aspect of the invention, but also in combination with other devices, e.g. in combination with an system or apparatus for moving a tubular between a substantially horizontal position and an upward angled position, e.g. substantially vertical position, said apparatus comprising:
  a base,
  a boom pivotally attached to the base about a horizontal boom pivot axis between a substantially horizontal position and an upward angled position, e.g. substantially vertical position,
  a boom pivot drive mounted on said base and adapted to pivot the boom,
  wherein the tubular gripper is attached to the boom and adapted for gripping the tubular.

A problem associated with known grippers is that the grippers have to handle tubulars with a range of different diameters, e.g. as different drilling activities for a well involve different diameter tubulars.

In the drilling industry many commonly used tubular grippers have the drawback that the centerline of a large diameter tubular held by the gripper is not at the same position relative to the frame of the gripper as the centerline of a small diameter tubular held by the gripper. To alleviate this problem "self-centering grippers" have been developed, e.g. as disclosed in U.S. Pat. No. 4,403,897. These known grippers have an intricate mechanical structure to obtain the centering of the different diameter tubulars on the common centerline relative to the gripper frame. This renders them prone to failure, especially in the harsh environments encountered in drilling operations.

The third aspect of the invention aims to provide an improved system and gripper device, that is structured such that for a range or series of different diameters of gripped tubulars the longitudinal tubular centerline is at a common fixed centered position relative to the frame of the gripper. This is e.g. beneficial in view of later alignment of the vertically raised tubular with the firing line of the drilling rig or similar in a pipe lay tower, e.g. in J-lay.

According to the third aspect of the invention the system comprises:
  a tubular support having support surfaces adapted to receive there against a tubular to be gripped by the gripper device so as to define a pre-gripping position of the tubular, e.g. said tubular support being connected to the gripper frame to provide stationary support surface relative to the frame,
  and further according to the third aspect of the invention the gripper device comprises:
  a rigid first jaw pivotally attached at a frame end thereof to the frame about a first jaw pivot axis that is stationary relative to the frame, the rigid first jaw having a pair of first and second diverging tubular engaging surfaces remote from the first jaw pivot axis, a rigid second jaw pivotally attached at a frame end thereof to the frame about a second jaw pivot axis that is stationary relative to the frame, the rigid second jaw having a pair of first and second diverging tubular engaging surfaces remote from the second jaw pivot axis, wherein the first and second jaw pivot axes are parallel to one another and stationary relative to the frame, a drive assembly adapted to cause simultaneous pivotal motion in opposed pivotal directions of the first and second jaws about their respective first and second jaw pivot axis between:

an opened position of the jaws, wherein the tubular to be gripped is positionable against the stationary tubular support surfaces without contacting the first and second jaws, and a gripping position of the jaws, wherein the pairs of first and second diverging tubular engaging surfaces establish a four-point gripping engagement onto the tubular, wherein the diverging tubular engaging surfaces of the first and second jaws are shaped such that—upon pivotal motion to the gripping position with a tubular against the tubular support surfaces—the first tubular engaging surfaces of the jaws engage on the tubular and move the tubular away from the tubular support surfaces until the second tubular engaging surfaces of the jaws engage on the tubular, and are shaped such that for a range of diameters of tubulars the longitudinal tubular centerline is at a common fixed centered position relative to the frame of the gripper.

It will be appreciated that the tubular gripper according to the third aspect of the invention can be used in combination with a system according to the first and/or second aspect of the invention. The system and gripper device of the third aspect of the invention can also be used independent from said first and second aspect of the invention, e.g. the gripper device being applied in a drilling rig piperacker embodied to grip a tubular, e.g. a drilling tubular, in vertical orientation from a storage station and transferring the tubular to the vertical firing line of a drilling rig.

The tubular support having support surfaces may be integrated into the gripper frame to provide stationary support surfaces relative to the frame, e.g. to allow placement of a tubular to be gripped in horizontal position on top of said surface when the gripper frame is in horizontal position.

One can also envisage that the tubular support is not integrated into the gripper frame, and is part of a tubular supply assembly distinct from the gripper frame. E.g. a supply assembly associated with a tubular storage station, wherein tubulars are stored in horizontal position and are sequentially rolled towards the gripper (in its horizontal position), with the tubular support being mobile between a support position so that the tubular resting thereon is supported in a pre-gripping position, and a retracted position (after the tubular has been gripped) that is out of the path of the gripper (e.g. when the boom is pivoted upwards).

In an embodiment the gripper frame has a front side or upper side, wherein the stationary tubular support surfaces adapted to receive the tubular there against are present at said front or upper side, and wherein the jaws—in opened position of the jaws—are fully retracted rearward of or below said front side or upper side. This embodiment is in particular advantageous in combination with the tubular support having support surfaces that are integrated into the gripper frame to provide stationary support surfaces relative to the frame.

In an embodiment the gripper is adapted to be with its gripper frame in horizontal orientation when receiving the tubular on the stationary tubular support surfaces integrated into a front or upper side of the frame, wherein the upper side is embodied to allow the tubular to roll over the upper side towards the stationary tubular support surfaces.

In an embodiment the first tubular engaging surfaces of the jaws are shaped with a continuous convex curvature and the second tubular engaging surfaces of the jaws are shaped with a continuous concave curvature. The curvature can be calculated on the basis of geometry of the jaws in conjunction with the tubular diameters that are to be handled by the gripper device whilst affording a common centerline centering of the envisaged tubulars.

In an embodiment the drive assembly comprises a motor acting on a driven jaw one of said first and second jaw, wherein a transmission is provided between said driven jaw and the other of said first and second jaw, e.g. a gear transmission with meshing gears that cause identical and opposite pivotal motion of the jaws.

The invention relates also to a drilling rig system with a drilling rig and a substantially vertical firing line for a tubulars string associated with said drilling rig, the rig being provided with a drawworks for raising and lowering a string of interconnected tubulars, the drilling rig system further being provided with a tubular handling apparatus according to the first and/or second aspect of the invention and/or a gripper according to the third aspect of the invention, and the system being provided with a tubular storage station adjacent the substantially horizontal position of the boom.

The invention relates also to a marine pipe laying system comprising pipe lay tower, e.g. for J-lay, and a pipelaying firing line associated with said tower, the system further being provided with a tubular storage station, the marine pipe lay system further being provided with a tubular handling apparatus according to the first and/or second aspect of the invention and/or a gripper according to the third aspect of the invention.

Furthermore, the invention relates to a method for handling tubulars between a substantially horizontal position and an upward angled position, wherein use is made of a tubular handling apparatus according to the first and/or second aspect of the invention and/or a gripper according to the third aspect of the invention.

A method comprises the steps of gripping the tubular by the gripper, when said tubular is in one of said substantially horizontal and upward angled position, and rotating the boom with respect to a base around a horizontal boom rotation axis, so that the tubular arrives at the other of the positions to be released by the gripper. This method can be, for example, part of a drilling operation or of an offshore pipe laying operation.

The aspects of the invention will be further described in the following detailed description in connection with the accompanying drawings.

Figure 2:
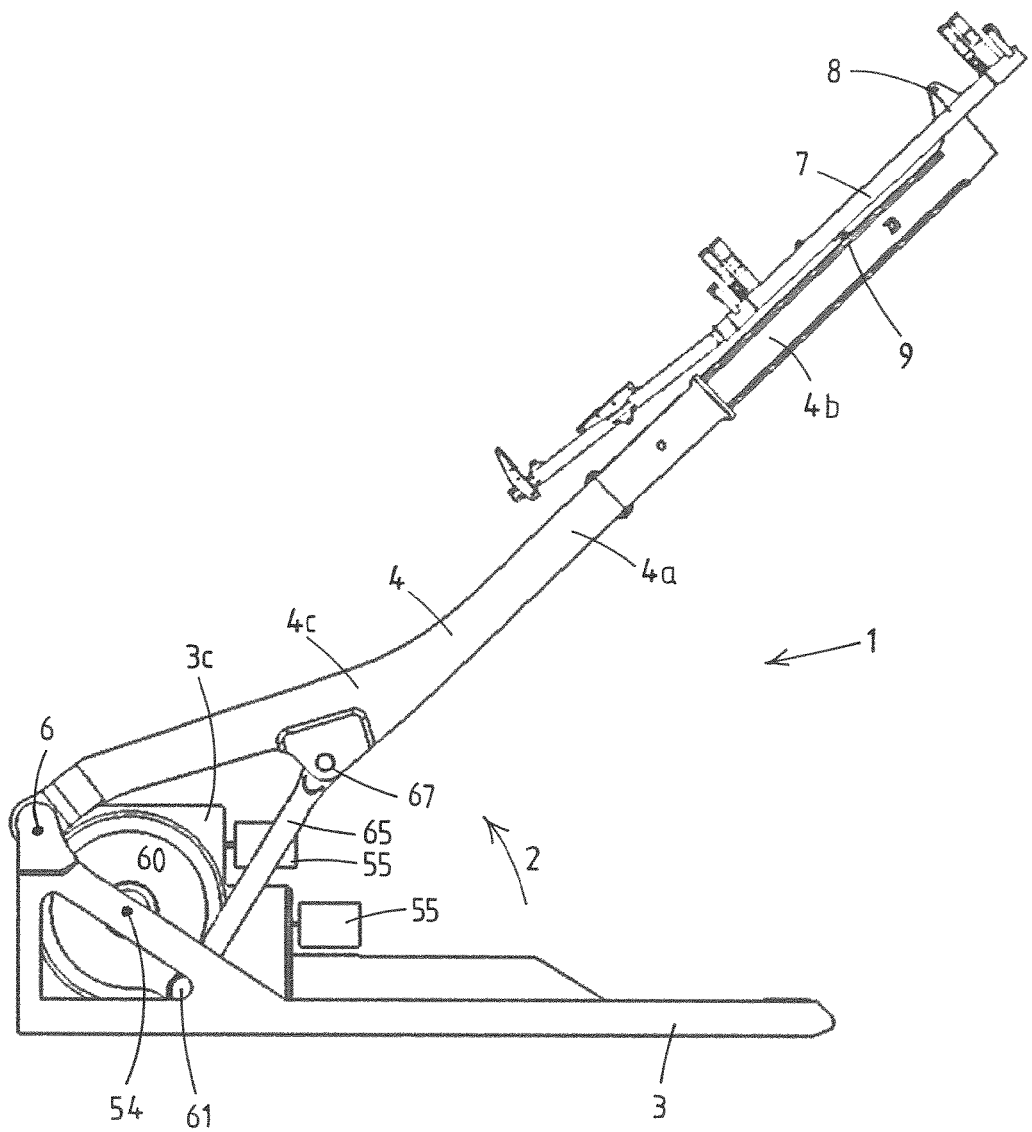
Figure 3:
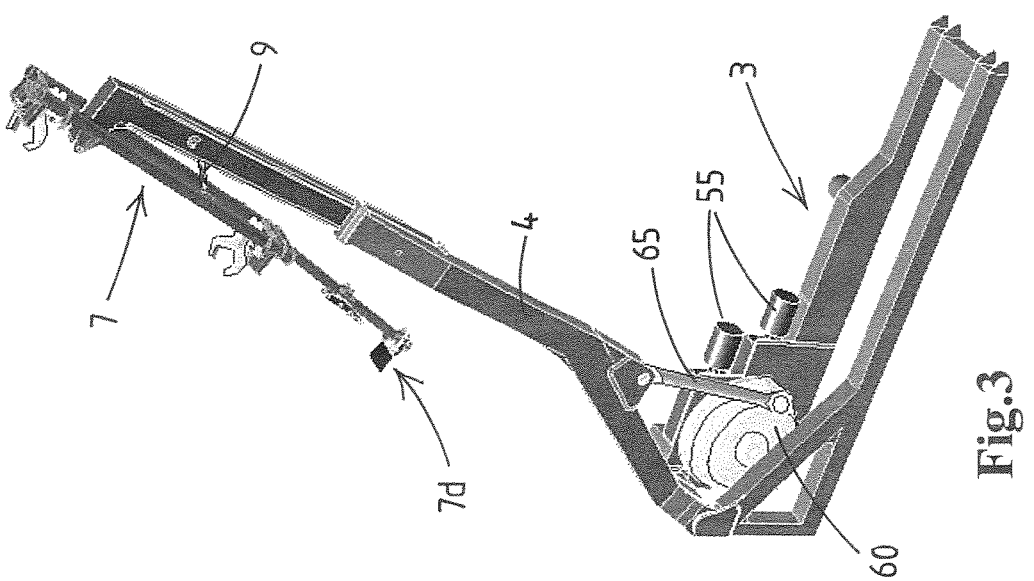
Figure 4:
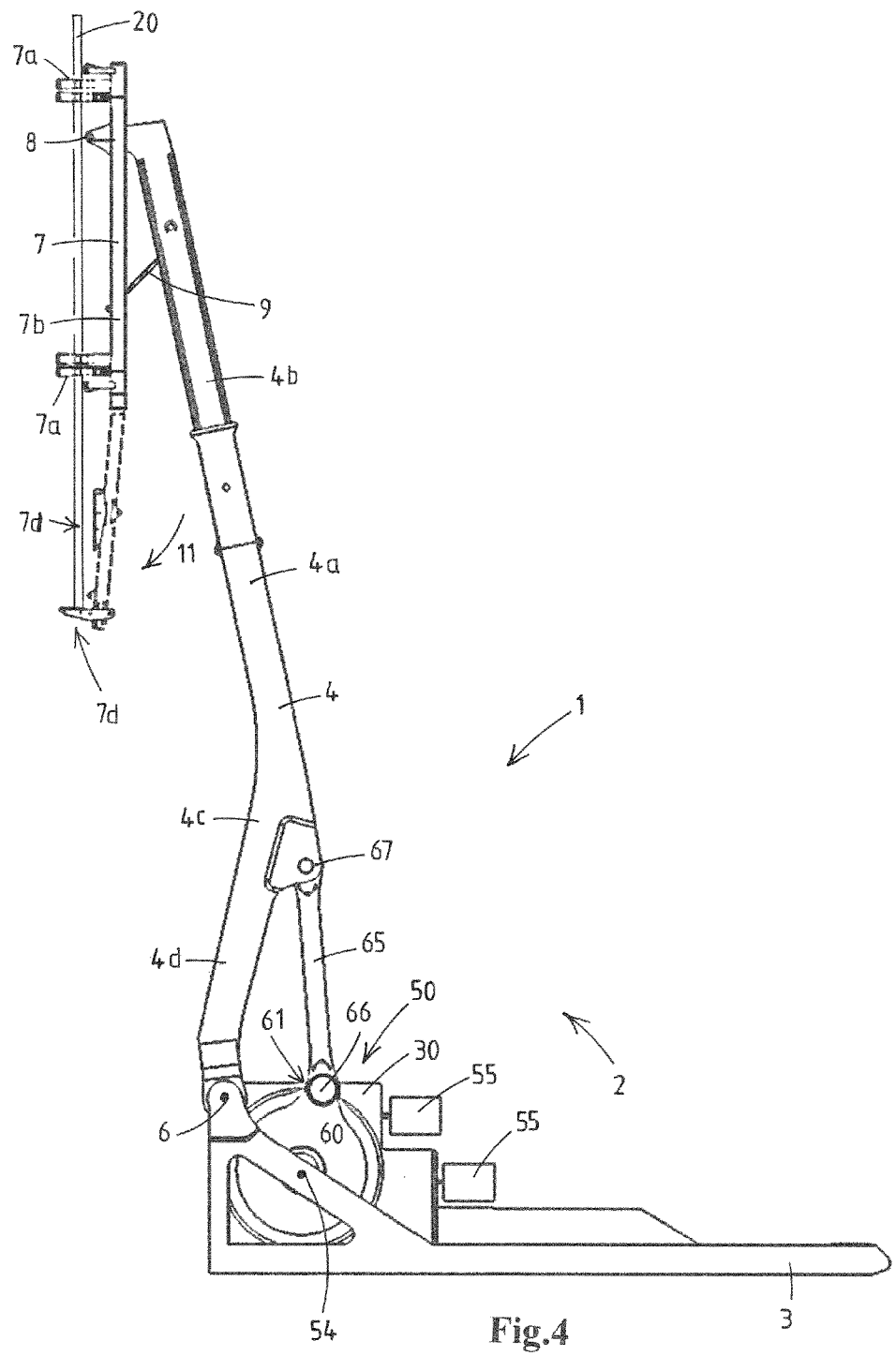
Figure 5A:
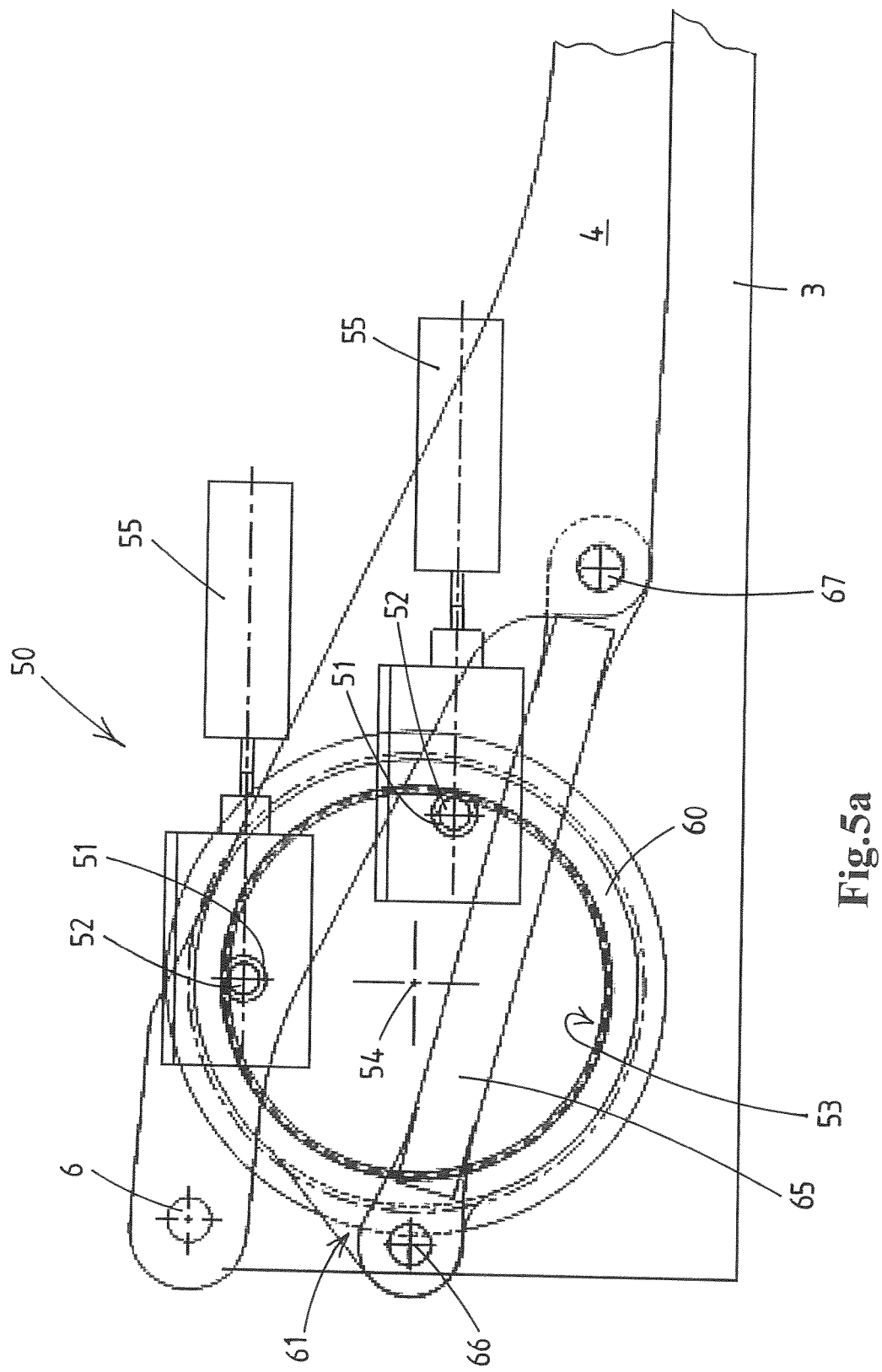
Figure 5B:
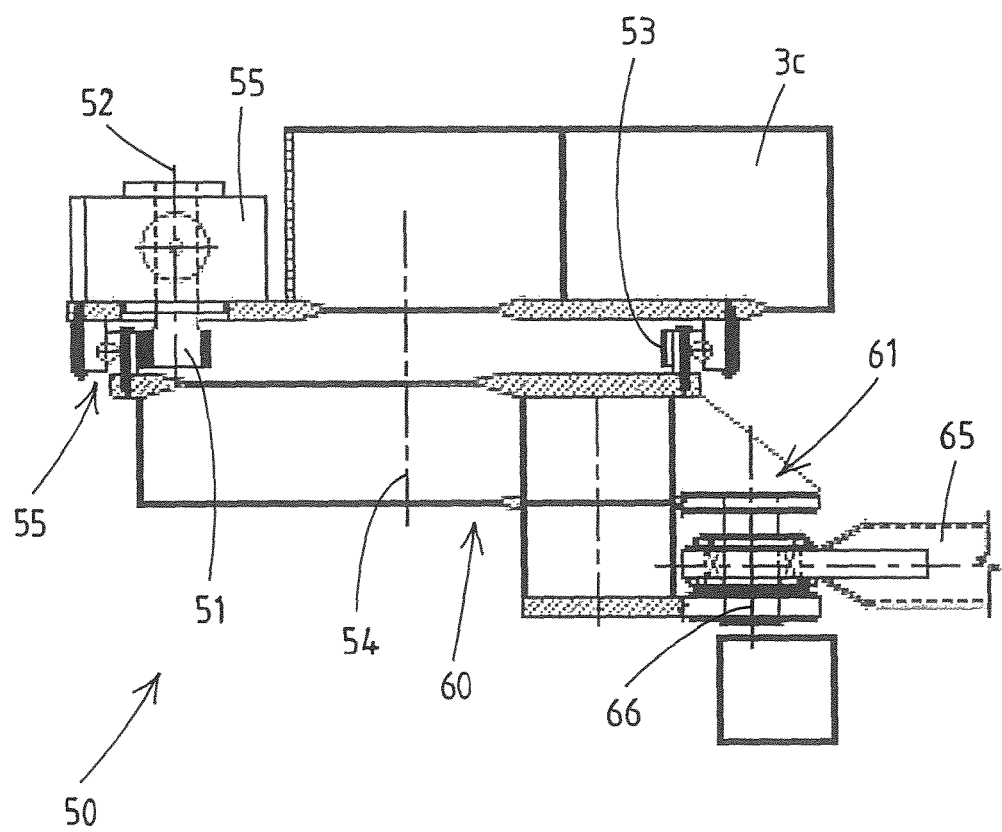
Figure 6:
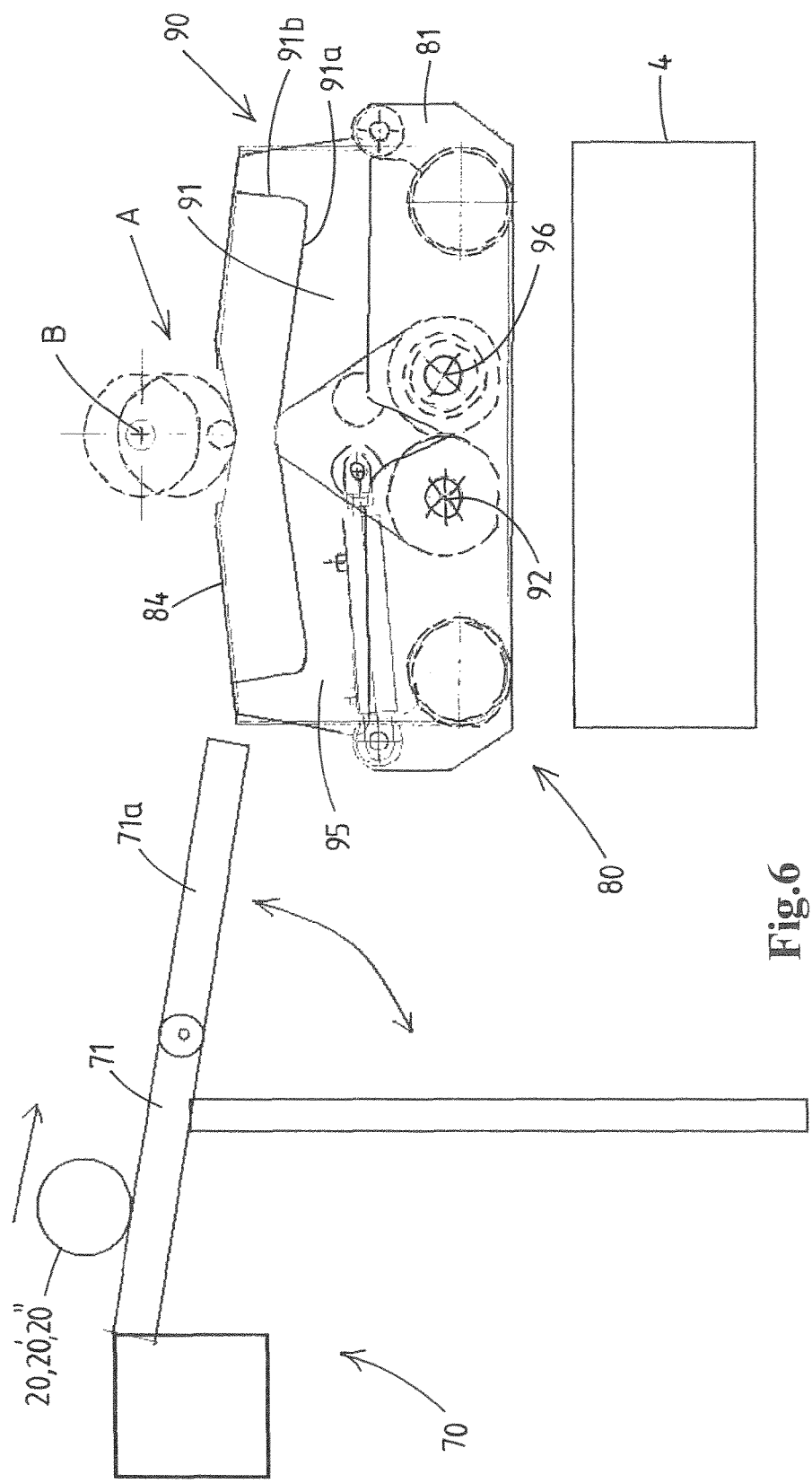

FIG. 1 shows in side view a tubular handling apparatus according to the first and second aspect of the invention without a tubular, with the boom in a substantially horizontal position, FIG. 2 shows in side view the tubular handling apparatus of FIG. 1 with the boom in an intermediate position, FIG. 3 shows the tubular handling apparatus of FIG. 1 in a perspective view, with the boom in an intermediate position, FIG. 4 shows in side view the tubular handling apparatus of FIG. 1 with the boom in a substantially vertical position, FIG. 5a shows schematically in side view an illustration of the boom pivot drive of the tubular handling apparatus of FIG. 1, FIG. 5b shows schematically in a cross section the boom pivot drive of FIG. 5a, FIG. 6 shows schematically a part of a tubulars storage station and a tubular handling apparatus equipped with a gripper according to the third aspect of the invention, FIGS. 7a-d illustrate the gripping of a tubular with the gripper of FIG. 6, FIGS. 8a-d illustrate the gripping of a tubular with an alternative gripper according to the third aspect of the invention.

In FIGS. 1-5 an example of a road vehicle transportable tubular handling apparatus 1 according to the first and second aspect of the invention is shown. The tubular 20, e.g. a drill pipe, itself is only schematically shown in FIG. 4.

The apparatus 1 basically comprises a base 3, a boom 4, and a gripper 7 for the tubular (shown in FIG. 4).

The boom 4 is pivotal with respect to the base 3 about a horizontal boom pivot axis 6 between a lowered, substantially horizontal position, shown in FIG. 1, via an intermediate position as shown in FIGS. 2, 3 to an upward angled, here near vertical position, shown in FIG. 4. As shown the boom 4 here is essentially horizontal in the lowered position and pivoted to a near vertical position.

In the shown embodiment, the base 3 comprises a flat-bed base part 3d, possibly with ISO freight container corner fittings 3a, preferably with a length and width similar to a 40 feet container. As is preferred the weight of the apparatus is also within limits placed on road transport of ISO containers.

Base part 3b is designed for pivotally attaching and supporting the lower end part of the boom 4. Base part 3c is adapted to support the boom pivot drive as will be explained below.

The boom 4 is pivotable between the lowered, substantially horizontal position, shown in FIG. 1, via an intermediate position as shown in FIG. 2,3 to a raised, substantially vertical position, shown in FIG. 4, by a boom pivot drive 50 in a boom pivot direction 2 around the horizontal boom rotation axis 6.

The boom 4 is here composed of two releasably interconnected boom parts 4a, 4b, wherein lower boom part 4a is connected to the base 3 via boom pivot axis 6 and upper boom part 4b holds the gripper 7.

In the shown embodiment, the lower boom part 4a comprises a kink 4c, as a result of which the main portion of the boom can rest at a substantially horizontal position on the flat-bed base part 3d of the base 3, as shown in FIG. 1, while the bent portion of the boom 4d, which extends between the boom pivot axis 6, which is at an elevated position with respect to the flat-bed base part 3d, and the kink 4c, extends slightly upwards in the position of FIG. 1.

The boom pivot drive 50 in the shown embodiment is according to both the first and second aspect of the present invention.

According to the first aspect, a central gear wheel and meshing drive gears are provided, which are not visible in FIGS. 1-4, but shown in detail in FIG. 5a,b.

The central gear wheel 53 is mounted rotatable with respect to the base 3 about a fixed horizontal central gear wheel axis 54, parallel to the horizontal boom pivot axis 6. The central gear wheel is connected via a crank-connection rod-transmission (explained below) to the boom 4.

In view of the required torque to pivot the boom 4, as well as in view of a smooth drive of the boom, it is considered advantageous that the central gear wheel has a pitch circle diameter of at least 0.75 meter, e.g. between 0.75 and 2.0 meters. By using a very large central gear wheel 53, significant torque can be achieved in combination with a smooth run and durability of the drive.

One or more meshing drive gears 51 are mounted rotatable with respect to the base about fixed horizontal gear axes 52 which are parallel to the horizontal boom pivot axis 6. The meshing drive gears have a diameter which is preferably significantly smaller than the diameter of the central gear. The drive gears are driven by gear drives, here comprising electromotors 55 provided with reductors, e.g. worm-gear reductors.

In the shown embodiment, the central gear wheel 53 is directly connected to a rotatable crank member 60, here embodied as a disc member.

This disc member 60 defines a crank which has a crank end 61 remote from the horizontal central gear wheel axis 54. In this embodiment, the rotatable crank member 60 is shaped as a disc member having an inner face to which the central gear 53 is attached. The central gear 53 has a circular inner face provided with teeth that mesh with teeth of the drive gears 51.

The central gear 53 is surrounded by a large circular roller bearing 55, which rotatably supports the central gear 53, and thus the disc member 60, relative to the base 3.

Effectively the disc member 60 is part of a housing or casing that shields the central gear 53 and the drive gears 51 from the environment.

The crank member 60 thus has a fixed horizontal axis, coinciding with the central gear wheel axis 54, and a bowl shape having an inner diameter allowing the housing of the central gear wheel and the one or more meshing drive gears.

At the exterior side of the crank member 60 a crank end member 61 is provided. Connecting rod 65 is pivotally attached to the crank end 61 via a first pivot axis 66, and pivotally attached to the boom 4 via a second pivot axis 67 that lies remote from axis 6. The horizontal boom pivot axis 6, the axis 54 and the first and second pivot axes 66, 67 of the connecting rod 65 are parallel to each other, forming a planar four-bar linkage.

In this example the connecting rod 65 is connected to the boom 4 essentially at the location of the kink 4c, extending essentially parallel to the boom 4. As a result of this configuration, the boom 4 is supported below the kink 4c by boom portion 4d and connecting rod 65.

The gripper 7 is pivotally attached to the boom 4, preferably near the end thereof, about a gripper pivot axis 8, parallel to the boom rotation axis 6. The gripper 7 is pivotal by a gripper rotation drive 9 in a gripper rotation direction 11 relative to the boom 4.

The gripper 7 can comprise any number and type of suitable tubular gripper members to get hold off and reliable hold the tubular.

As is preferred the gripper 7 comprises two spaced apart grippers 7a mounted on a gripper frame 7b.

The gripper frame 7b here is an elongated frame, having a longitudinal axis in the direction of the tubular to be gripped. In this example the gripper rotation drive 9 comprises a hydraulic cylinder arranged between the boom 4 and the gripper frame 7b.

The gripper 7 may be equipped with one or more tubular end stop members 7d, adapted as end stop for the lower end of the tubular so that the tubular is correctly position in longitudinal direction relative to the gripper 7. Each end stop member 7d may be mobile between a deployed and retracted position (see FIG. 4).

In this example the beam parts 4a, b of the boom 4 are telescopic or releasably attached to one another. A special drive could be provided to cause telescopic motion.

The base 3 is here designed with dimensions of an ISO freight container, possibly with ISO freight container corner fittings 3a. As the boom 4 can be reduced in length for transportation purposes, the entire apparatus can be reduced to a size of an ISO freight container, preferably a 40 feet container.

The operation of the boom pivot drive 50 is as follows: at rest, as visible in FIG. 1, a large portion of the boom 4 rests at the flat-bed base part 3d of the base 3, while the connecting rod 65 also extends essentially horizontally. Upon actuating the gear drive motors 55, the drive gears 51 meshing with the central gear wheel 53 cause the central gear wheel 53 and the connected crank member 60 to rotate. Hence, crank end 61 is rotating anti-clockwise from the position shown in FIG. 1, i.e. at the "9" of a clock, via the position shown in FIG. 2, i.e. at the "5" of a clock, to the position shown in FIG. 4, i.e. almost at the "12" of a clock. As a result of the rotation of the crank end 61 and the planar four-bar linkage construction with the base 3 and the connecting rod 65, the boom 4 is accordingly pivots in an anti-clockwise direction 2 to the substantially vertical position of FIG. 4. To pivot the boom back to the horizontal position of FIG. 1, it is possible to actuate the drive gears 51 such that the crank end 61 is given a continued movement in the anti-clockwise direction. This requires very accurate control of the gear drives of the drive gears 51. Alternatively, it is possible to counter-actuate the drive gears such that the crank end is allowed to move back in a clockwise direction.

With reference to FIGS. 6 -8 now the third aspect of the present invention will be elucidated.

In FIG. 6 a part of a tubulars storage station 70 is shown wherein tubulars 20', 20" are stored in horizontal orientation. The station includes a roll track 71 along which a tubular 20', 20" is rolled towards the gripper 80 of a tubular handling apparatus equipped with the gripper 80.

For illustration of the gripper device 80, the FIGS. 7a-d show a largest diameter tubular 20' and a smallest diameter tubular 20".

The tubular handling apparatus may be embodied as to the first and/or second aspect of the invention, and may be embodied as shown in the FIGS. 1-5. In FIG. 6 a part of pivotal boom 4 is shown, which is pivotal relative to a base (e.g. as base 3) by a boom pivot drive (e.g. as discussed herein).

As is preferred, gripper 80 is mounted at the front or upper end of the boom 4 such that the gripper 80 is "on top of" the boom 4 in its horizontal position. The boom 4 can, after the tubular 20 has been gripped, be angled upwardly, e.g. as discussed herein to bring the tubular in a firing line of a drilling station.

The gripper 80 has a frame 81, here with longitudinal frame members 82, 83 similar to the frame depicted in FIG. 3.

As preferred, at two spaced apart position along the length of the frame 81, a gripper device 90 is provided to grip the tubular 20. Each gripper device 90 is adapted to grip and hold a circular cross-section tubular 20 having a diameter and longitudinal tubular centerline.

In this example, as also in FIG. 8, the gripper frame 81 is provided with a tubular support, e.g. one or more support members transverse to the frame length, which support has one or more support surfaces 84 adapted to receive thereon the tubular 20', 20" to be gripped by the gripper device in a pre-gripping position of the tubular.

By way of example, the roll track 71 is embodied such that the tubular 20', 20" rolls onto the tubular support of the frame, towards the indented portion of the surface 84 which defines the pre-gripping position A. Possibly the roll track includes a mobile track part 71a that in a retracted position allows for pivotal motion of the boom 4 and the gripper 80, and in deployed position (shown in FIG. 6) allows to roll the tubulars onto the surface 84.

In another embodiment, not shown here, the tubular storage station comprises a tubular support that supports the tubular in a pre-gripping position, so that the gripper does not have to have the surfaces 84 for this purpose. For example the tubular support is mobile between a deployed position and a retracted position out of the path of the gripper 80 and boom 4.

As the gripper devices shown in FIGS. 7 and 8 are essentially of similar structure, only FIG. 7 will now be used to explain the structure.

The gripper device 90 comprises:
a rigid first jaw 91 pivotally attached at a frame end thereof to the frame 81 about a first jaw pivot axis 92 that is stationary relative to the frame 81, the rigid first jaw 91 having a pair of first and second diverging tubular engaging surfaces 91a, b remote from the first jaw pivot axis 92, and
a rigid second jaw 95 pivotally attached at a frame end thereof to the frame 81 about a second jaw pivot axis 96 that is stationary relative to the frame 81, the rigid second jaw having a pair of first and second diverging tubular engaging surfaces 95a, b remote from the second jaw pivot axis 96.

The first and second jaw pivot axes 92, 96 are parallel to one another, possibly coinciding, and stationary relative to the frame 81.

The gripper device further comprises a drive assembly, here including a hydraulic actuator 100, that is adapted to cause simultaneous pivotal motion in opposed pivotal directions of the first and second jaws 91, 95 about their respective first and second jaw pivot axis 92, 96 between:
an opened position of the jaws (see FIG. 7a), wherein the tubular is positionable against the tubular support surfaces 84 without contacting the first and second jaws 91, 95, and
a gripping position of the jaws (see FIG. 7c for tubular 20' and FIG. 7d for tubular 20"), wherein the pairs of first and second diverging tubular engaging surfaces 91a, b, 95a, b establish a four-point gripping engagement onto the tubular, respectively 20', and 20".

The diverging tubular engaging surfaces 91a, b, 95a, b of the first and second jaws 91, 95 are shaped such that—upon pivotal motion to the gripping position with a tubular 20', 20" against the tubular support surfaces 84—the first tubular engaging surfaces 91a, 95a, of the jaws 91, 95 engage on the tubular 20', 20" and move the tubular away from the tubular support surfaces 84 until the second tubular engaging surfaces 91b, 95b of the jaws engage on the tubular.

Figure 7A:
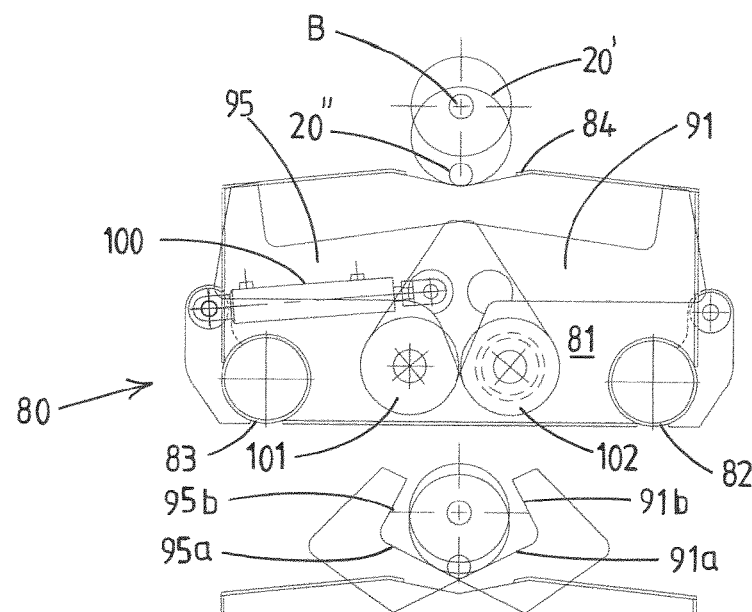
Figure 7B:
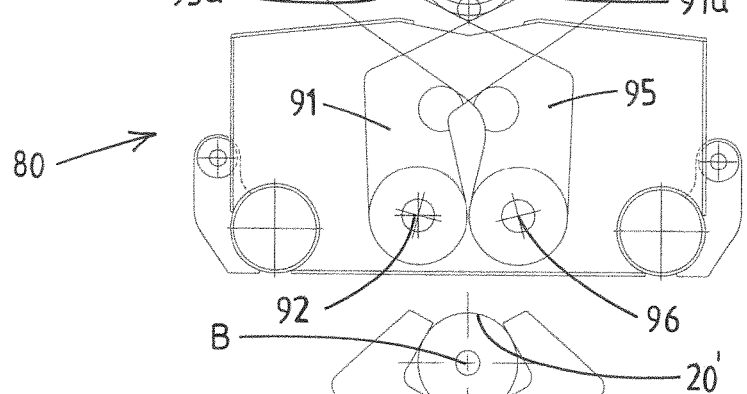
Figure 7C:
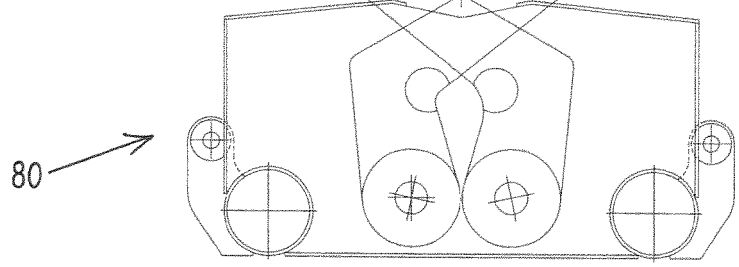
Figure 7D:
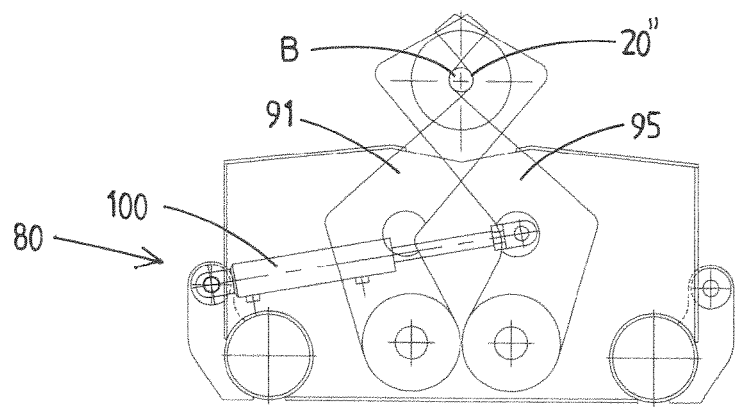

Also, as can be seen in FIGS. 7c, d, these diverging tubular engaging surfaces 91a, b, 95a, b of the first and second jaws 91, 95 are shaped such that for a range of diameters of tubulars (here illustrated by smallest diameter tubular 20"and largest diameter tubular 20') the longitudinal tubular centerline is at a common fixed centered position, indicated with B, relative to the frame 81 of the gripper 80.

As can be seen in FIGS. 6 and 7a, the tubular support is integrated in the frame 81 of the gripper and provides stationary support surfaces 84 adapted to receive the tubular there against at said front or upper side. The jaws 91, 95—in opened position of the jaws—are fully retracted rearward of or below said front side or upper side such that the tubular does not collide with the jaws and the tubular can roll onto said support surfaces 84 towards the pre-gripping position. The removal of a tubular from the gripper when operating in reverse, e.g. during tripping, can be done by opening the jaws 91, 95 so as to release the tubular 20, and then rolling the tubular over the surfaces 84 to a side of the gripper, e.g. onto a roll track for discharge of tubulars.

As is preferred for practical purposes the gripper device is embodied such that the range of diameters of tubulars for which the longitudinal tubular centerline is at a common fixed centered position B relative to the frame of the gripper has a ratio between the largest and smallest tubular diameter between 8 and 2, e.g. between 6 and 4.

It will be appreciated that design of the jaws 91, 95 and the shape of the diverging tubular engaging surfaces 91*a*, *b*, 95*a*, *b* is based on geometrical calculations, based on the desired range or series of different diameter tubulars that should be handled by the grippers. This may result in straight or rectilinear surfaces as shown in FIGS. 7*a*-*d*, but it is also envisaged that the first tubular engaging surfaces of the jaws are shaped with a continuous convex curvature and the second tubular engaging surfaces of the jaws are shaped with a continuous concave curvature, as is shown in FIGS. 8*a*-*d*.

As can be seen the gripper drive assembly comprises a motor, here cylinder 100, acting on a driven jaw of said first and second jaws, here jaw 91, and a transmission is provided between this driven jaw 91 and the other of said first and second jaws, here jaw 95. It is schematically shown that this transmission may be a gear transmission with meshing gears 101, 102 directly coupled to a respective jaw, which gears that cause identical and opposite pivotal motion of the jaws. Other transmissions may also be provided, e.g. with a chain. One can also envisage that each gripper has its own motor 100 and thus forms a drive jaw.

The invention claimed is:

1. A system for handling tubulars, said system comprising an apparatus for moving a tubular between a substantially horizontal position and an upward angled position, said apparatus comprising:
   a base;
   a boom pivotally attached to the base about a horizontal boom pivot axis between a substantially horizontal position and an upward angled position;
   a boom pivot drive mounted on said base and adapted to pivot the boom; and
   a tubular gripper attached to the boom and adapted for gripping the tubular,
   wherein the boom pivot drive comprises:
      a central gear wheel rotatably mounted on the base about a central gear wheel axis parallel to the horizontal boom pivot axis;
      one or more drive gear members that are each rotatably mounted on the base and each rotatable about a corresponding drive gear member axis, meshing with the central gear wheel;
      one or more motors connected to said one or more drive gear members and allowing to drive said one or more drive gear members so as to pivot the boom between said substantially horizontal position and said upward angled position;
      a crank member directly connected to the central gear wheel, the crank member being rotatable in unison with the central gear wheel about the central gear wheel axis, and having a crank end remote from the central gear wheel axis; and
      a connecting rod pivotally attached to the crank end via a first pivot axis, and pivotally attached to the boom via a second pivot axis remote from the boom pivot axis,
   wherein the horizontal boom pivot axis, and the first and second pivot axes of the connecting rod are parallel to each other.

2. The system according to claim 1, wherein said one or more motors are electromotors having a rotary output shaft connected to said one or more drive gear members.

3. The system according to claim 1, wherein the drive gear member axis of each of said one or more drive gear members is parallel to the central gear wheel axis.

4. The system according to claim 2, wherein the drive gear member axis of each of said one or more drive gear members is parallel to the central gear wheel axis.

5. The system according to claim 1, wherein at least two drive gear members are present, each connected to an associated motor, the motors being embodied such that the boom is pivotal by a single motor in case of failure of one or more other motors.

6. The system according to claim 4, wherein the central gear wheel has a pitch circle diameter of at least 0.75 meter.

7. The system according to claim 1, wherein the central gear wheel is an annular gear wheel having gear teeth on an inner face thereof.

8. The system according to claim 7, wherein the pivot boom drive comprises a rotatable crank disc member rotatably mounted to the base so as to be rotatable about the central gear wheel axis, said crank disc member having an inner face to which the central gear wheel is attached, and said crank disc member having an outer face provided with a first pivot axis connection to the connecting rod.

9. The system according to claim 8, wherein a roller bearing is provided between the base and the gear wheel, the roller bearing extending around the central gear wheel.

10. The system according to claim 1, wherein the gripper is pivotally attached to the boom about a gripper pivot axis, parallel to the boom pivot axis, to allow for pivoting of the gripper relative to the boom.

11. The system according to claim 10, wherein the boom has a near vertical end position, and the gripper is pivotal to assume an exact vertical end position with said boom in the near vertical end position.

12. The system according to claim 10, wherein the gripper is pivotal relative to the boom by a gripper pivot drive, comprising a hydraulic cylinder extending between the gripper and the boom at a distance from the gripper pivot axis.

13. The system according to claim 12, wherein the boom has a near vertical end position and the gripper pivot drive allows to bring the gripper in an exact vertical end position, wherein the gripper pivot drive comprises a control unit that is adapted to perform the gripper pivot motion before the boom reaches the near vertical end position.

14. The system according to claim 1, wherein the base has a length and a width corresponding with the dimensions of an ISO freight container.

15. The system according to claim 1, wherein the boom has, in a substantially horizontal position thereof, a greater length than the length of the base, and wherein the boom is composed of a base boom part connected via the boom pivot axis to the base and an extension boom part, the base boom part having a length such as to not extend beyond the base when in the substantially horizontal position, and the extension boom part being telescopic relative to the base boom part or being releasably fastened to the base boom part, and wherein the gripper is attached to the extension boom part.

16. The system according to claim 14, wherein the boom has, in a substantially horizontal position thereof, a greater length than the length of the base, and wherein the boom is composed of a base boom part connected via the boom pivot axis to the base and an extension boom part, the base boom part having a length such as to not extend beyond the base when in the substantially horizontal position, and the extension boom part being telescopic relative to the base boom part or being releasably fastened to the base boom part, and wherein the gripper is attached to the extension boom part.

17. The system according to claim 1, said system further comprising a tubulars storage station to be arranged adjacent the tubular handling apparatus, said storage station allowing for storage of multiple tubulars and sequential transfer of tubulars to the tubular handling apparatus.

18. The system according to claim 17, wherein the storage station allows for storage of multiple tubulars in a horizontal position, parallel to the gripper when the boom is in the substantially horizontal position.

19. The system according to claim 1, further comprising a drilling rig having a firing line, and the tubular handling apparatus is arranged to move tubulars between said firing line and a tubulars storage station.

20. The system according to claim 1, further comprising a marine pipe lay structure adapted to lay pipe on the seabed, said pipe lay structure having a firing line, and the tubular handling apparatus being arranged to move tubulars between a tubulars storage station and said firing line.

21. The system according to claim 1, further comprising one or more tubulars to be handled by the tubular handling apparatus.

22. The system according to claim 21, said tubular being one of a drill pipe, a drill collar, a casing, a production tubing, a sucker rod, a pump column pipe, a logging tool pipe, and a hydrocarbon transportation subsea pipe.

23. The system according to claim 1, wherein the upward angled position is a substantially vertical position.

24. A method for handling tubulars between a substantially horizontal position and an upward angled position, said method comprising the steps of:
  using the system according to claim 1;
  gripping the tubular by the gripper in one of said substantially horizontal position and an upward angled position; and
  pivoting with respect to a base, so that the tubular is brought in the other of said substantially horizontal position and an upward angled position.

* * * * *